(12) United States Patent
Moroo et al.

(10) Patent No.: US 7,477,798 B2
(45) Date of Patent: Jan. 13, 2009

(54) SPECIFIED IMAGE POSITION ESTIMATING APPARATUS AND METHOD, SPECIFIED IMAGE POSITION ESTIMATING PROGRAM, AND SPECIFIED IMAGE POSITION ESTIMATING PROGRAM RECORDED COMPUTER-READABLE RECORDING MEDIUM, MEDIUM, GAME SYSTEM, AND TRANSACTION APPARATUS

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 10/962,512

(22) Filed: Oct. 13, 2004

(65) Prior Publication Data

US 2005/0226534 A1 Oct. 13, 2005

(30) Foreign Application Priority Data

Apr. 2, 2004 (JP) ............................. 2004-110116

(51) Int. Cl.
*G06K 9/36* (2006.01)
*G06K 9/64* (2006.01)
(52) U.S. Cl. ...................................... 382/291; 382/278
(58) Field of Classification Search ................ 382/291, 382/287, 286, 306, 278, 276
See application file for complete search history.

(56) References Cited

U.S. PATENT DOCUMENTS

| 6,115,494 A | 9/2000 | Sonoda et al. ............... 382/165 |
| 2006/0072828 A1* | 4/2006 | Silverbrook et al. ......... 382/203 |

FOREIGN PATENT DOCUMENTS

| EP | 0672994 | * | 9/1995 |
| JP | 7-254037 | | 10/1995 |
| JP | 9-18707 | | 1/1997 |
| JP | 11-234516 | | 8/1999 |

* cited by examiner

*Primary Examiner*—Yon Couso
(74) *Attorney, Agent, or Firm*—Staas & Halsey LLP

(57) ABSTRACT

According to the present invention, in a specified image position estimating apparatus, for, even if an original image varies in size to vary a size of a mark, detecting the mark in the original image fast and accurately to securely estimate the position of a specified image included in the original image, there are provided a position detection point detecting unit for, in a state where three or more position detection marks, each of which is made such that two or more straight lines intersect with each other or come into contact with each other at one position detection point, are affixed to the original image, detecting the position detection point of each of the position detection marks on the original image and a specified image position estimating unit for estimating the position of the specified image in the original image on the basis of the position detection point.

10 Claims, 15 Drawing Sheets

SPECIFIED IMAGE POSITION ESTIMATING APPARATUS AND METHOD, SPECIFIED IMAGE POSITION ESTIMATING PROGRAM, AND SPECIFIED IMAGE POSITION ESTIMATING PROGRAM RECORDED COMPUTER-READABLE RECORDING MEDIUM, MEDIUM, GAME SYSTEM, AND TRANSACTION APPARATUS

BACKGROUND OF THE INVENTION

1) Field of the Invention

The present invention relates to a specified image position estimating apparatus made to estimate a position of a specified image within an image, a specified image position estimating method, specified image position estimating program, specified position estimating program recorded computer-readable recording medium, and medium having an image to which a mark is affixed or added for estimating a position of a specified image.

2) Description of the Related Art

So far, a mark has been embedded in an image for estimating a position of a specified image in the image.

For example, Japanese Patent Laid-Open No. HEI 7-254037 discloses a technique in which a mark 30 (positioning symbol) having a square configuration shown in FIG. 18 is embedded in an image 31 to specify a position of a specified image (in this case, two-dimensional code) on the basis of this mark 30.

In addition, there has been proposed a technique in which, in a case in which a mark is affixed onto an image for some purpose, the mark is yellowed when the mark is placed in a white area on the image so that it becomes unremarkable (for example, see Japanese Patent Laid-Open No. HEI 9-018707).

Meanwhile, although Japanese Patent Laid-Open No. HEI 7-254037 employs a method of tracking, one by one, a pixel constituting an image as a method of detecting the mark 30 affixed to an image, this method cannot detect the mark 30 at a high speed.

Therefore, as a method of detecting a mark in an image fast and accurately, it is considered to scan a template having a shape similar to that of the mark in the image for detecting the mark on the basis of the agreement with this template.

However, in a case in which an image is picked up through the use of a camera or the like to fetch image data for detecting a mark in the fetched image, the size of the picked-up image and the size of the mark affixed to the image vary in accordance with the distance (imaging distance) between the camera and the image. In a case in which this mark has a shape shown in FIG. 18 or it is a triangular mark 33 shown in FIG. 19 in Japanese Patent Laid-Open No. HEI 9-018707, if the size of the mark varies as mentioned above, difficulty is encountered in detecting the mark through the use of the template having a fixed size, and difficulty is experienced in estimating the position of a specified image fast and accurately.

SUMMARY OF THE INVENTION

The present invention has been developed with a view to eliminating these problems, and it is therefore an object of the invention to provide a specified image position estimating apparatus, specified image position estimating method, specified image position estimating program, specified position estimating program recorded computer-readable recording medium, and medium, capable of, even if an original image varies in size to vary the size of a mark, detecting the mark in the original image fast and accurately to securely estimate the position of a specified image included in the original image.

For this purpose, in accordance with an aspect of the present invention, there is provided a specified image position estimating (presuming) apparatus comprising position detection point detecting unit for, in a state where three or more position detection marks, each of which is made such that two or more straight lines intersect with each other or come into contact with each other at one position detection point, are affixed to an original image, detecting the position detection point of each of the position detection marks on the original image, and specified image position estimating unit for estimating a position of a specified image in the original image on the basis of the position detection point detected by the position detection point detecting unit.

In addition, for the aforesaid purpose, in accordance with another aspect of the present invention, there is provided a specified image position estimating method comprising a position detection point detecting step of, in a state where three or more position detection marks, each of which is made such that two or more straight lines intersect with each other or come into contact with each other at one position detection point, are affixed to an original image, detecting the position detection point of each of the position detection marks on the original image, and a specified image position estimating step of estimating a position of a specified image in the original image on the basis of the position detection point detected in the position detection point detecting step.

Still additionally, for the aforesaid purpose, in accordance with a further aspect of the present invention, there is provided a specified image position estimating program which makes a computer function as a position detection point detecting unit for, in a state where three or more position detection marks, each of which is made such that two or more straight lines intersect with each other or come into contact with each other at one position detection point, are affixed to an original image, detecting the position detection point of each of the position detection marks on the original image, and a specified image position estimating unit for estimating a position of a specified image in the original image on the basis of the position detection point detected by the position detection point detecting unit.

Yet additionally, for the aforesaid purpose, in accordance with a further aspect of the present invention, there is provided a computer-readable recording medium which records the aforesaid specified image position estimating program.

Moreover, for the aforesaid purpose, in accordance with a further aspect of the present invention, there is provided a medium in which three or more position detection marks where two or more straight lines intersect with each other or come into contact with each other at one position detection point are formed along with a specific image which is an object of position estimation.

Thus, according to the present invention, for estimating (presuming) a position of a specified image included in an original image from the original image to which affixed are three or more position detection marks, each of which is made such that two or more straight lines intersect with each other or come into contact with each other at one position detection point, the one position detection point is detected and the position of the specified image is estimated on the basis of the detected position detection point. Therefore, even if the size of the original image varies so that the size of the position detection mark varies, the position of the specified image in the original image is detectable fast and accurately.

DESCRIPTION OF THE PREFERRED EMBODIMENTS

Embodiments of the present invention will be described hereinbelow with reference to the drawings.

[1] Embodiment of the Present Invention

Figure 1:
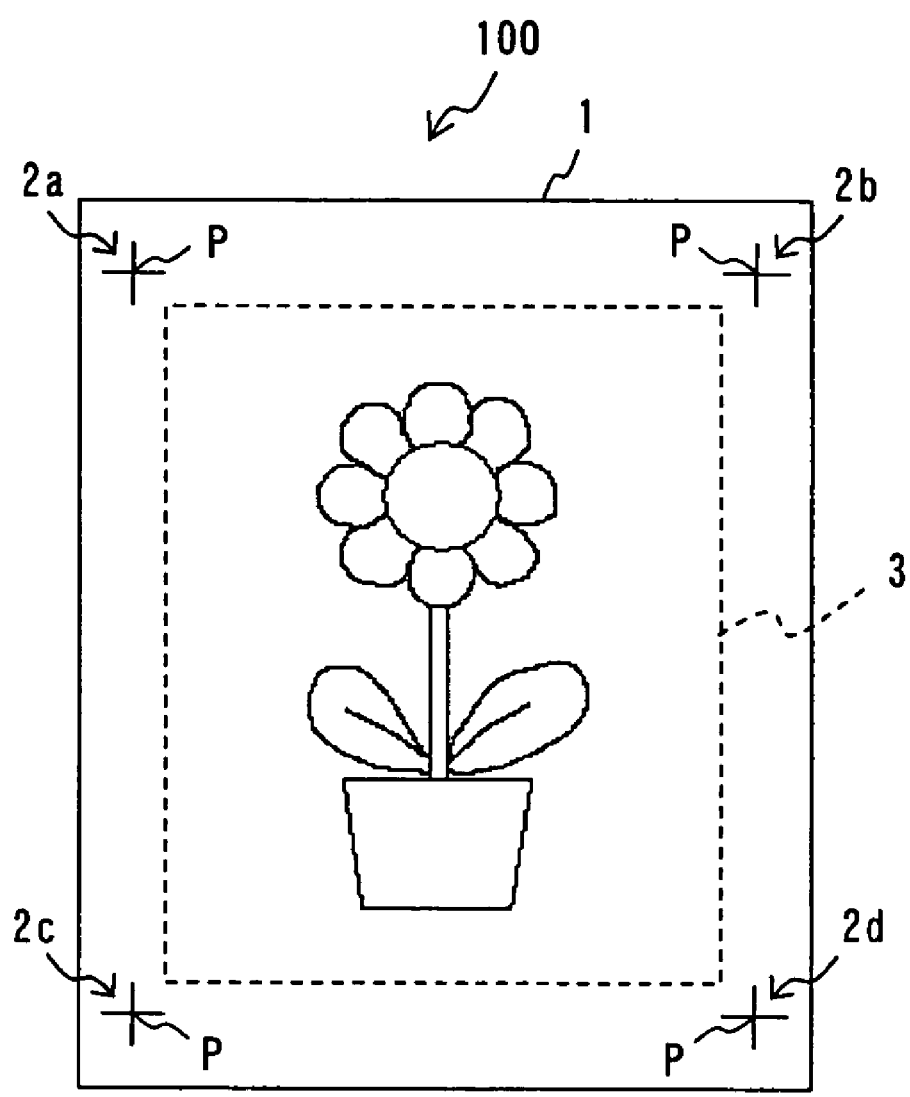
FIG. 1 is an illustrative view showing a medium according to an embodiment of the present invention.

A description will be given hereinbelow of a specified image position estimating apparatus and a specified image position estimating method according to an embodiment of the present invention. The description will first be given of an image which is an object of position estimation. FIG. 1 is an illustrative view showing a position estimation object image in this embodiment.

As FIG. 1 shows, a position estimation object image 1 according to this embodiment is formed, for example, on a medium 100 such as paper or cloth, and a specified image 3 exists therein. Moreover, position detection marks 2a to 2d are affixed (added) to four corners outside the specified image 3 in the position estimation object image 1. Incidentally, although in FIG. 1 the position detection marks 2a to 2d are enlargedly shown in black for convenience only, it is preferable that, in the medium 100 serving as an actual position estimation object image, the position detection marks 2a to 2d are recognizable by a position detection point detecting unit 22, which will be mentioned later, but they are formed in color and size which are unrecognizable by human beings. For example, in a case in which the color on the image 1 to which the position detection marks 2a to 2d are to be affixed is white or generally white, the position detection marks 2a to 2d are preferably formed in yellow. Moreover, in a case in which the color on the image 1 to which the position detection marks 2a to 2d are to be affixed is black or generally black, the position detection marks 2a to 2d are preferably formed in blue. This causes the position detection marks 2a to 2d to be invisible to human beings.

Each of the position detection marks 2a to 2d is made in a manner such that at least two straight lines (line segments) intersect with each other or come into contact with each other at one point (position detection point), and in the example shown in FIG. 1, it is composed of two straight lines (line segments) and is made by orthogonalizing these two straight lines at the position detection point P. Therefore, even if the position detection marks 2a to 2d (which will hereinafter be referred simply to as the "position detection mark 2" in a case in which they are not discriminated from each other) vary in size, the configuration of the vicinity portion around the position detection point P does not vary. That is, since the position detection mark 2 shows a crucial (cross) pattern, even if the size of the position detection mark 2 itself varies, the shape in the vicinity of the center (position detection point P) of the crucial pattern does not vary and is left as it is. Accordingly, when the position detection mark 2 is detected through the use of a position detection point detecting unit 22 (see FIG. 2), the employment of this position detection mark 2 enables the detection of the position detection mark 2 to be made only by paying attention to a portion of the position detection mark 2, as a region of interest (ROI), around the position detection point P.

In addition, as mentioned above, the position estimation object image (which will hereinafter be referred to simply as the "image") 1 includes a specified image 3, and the specified image position estimating apparatus and the specified image position estimating method according to this embodiment are made so as to estimate the position of this specified image 3 as will be described later. In this connection, a system written in an application example [2] of the present invention, which will be described later, is realizable in a manner such that, for example, through the use of a technique written in Japanese Patent Application (Patent Application No. 2003-142582) filed by this applicant on May 20, 2003, other information (electronic watermark) different from image data (i.e., visual information) is embedded in the entire specified image 3 or in a portion thereof and the position of the specified image 3 is estimated to extract (decode) the aforesaid other information through the use of a decoder.

Figure 2:
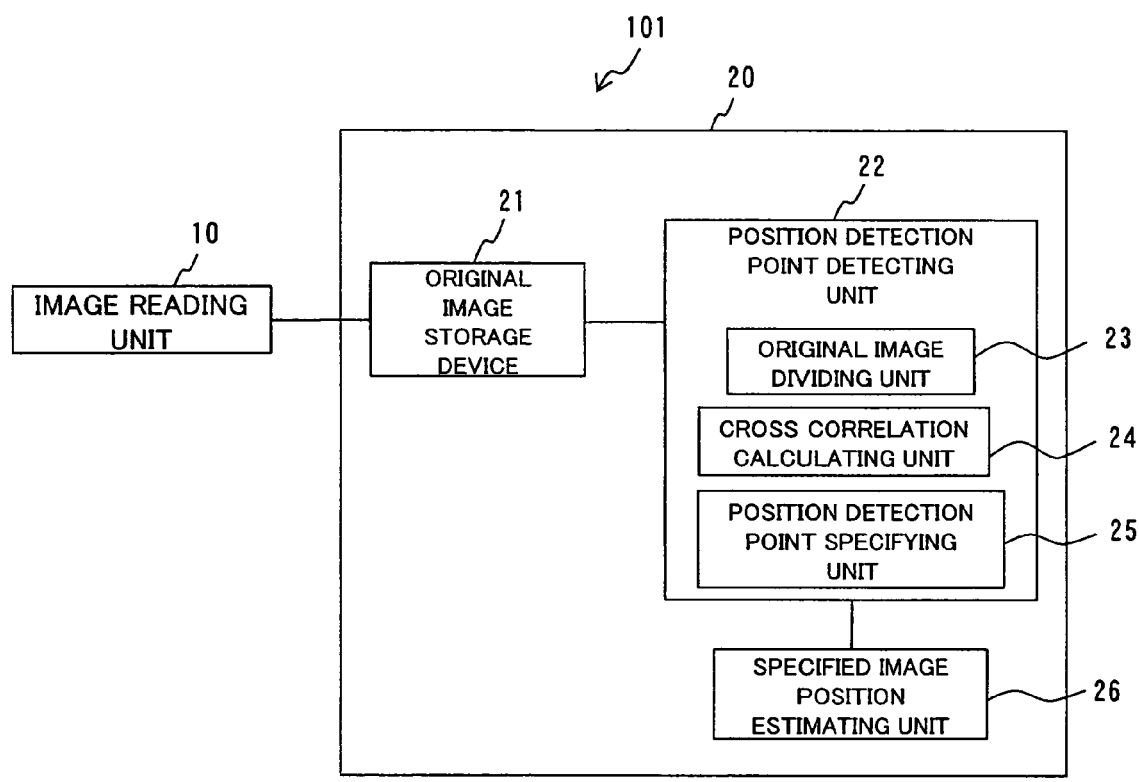
FIG. 2 is a block diagram showing a specified image position estimating apparatus according to an embodiment of the present invention.

Secondly, a description will be given hereinbelow of the specified image position estimating apparatus according to this embodiment. FIG. 2 is a block diagram showing a functional configuration of the specified image position estimating apparatus according to this embodiment. As shown in FIG. 2, a specified image position estimating apparatus 101 according to this embodiment is made up of an image reading unit 10 for reading (fetching) the aforesaid image 1 as an original image and an arithmetic unit 20 comprising an MPU (Micro Processing Unit) or a CPU (Central Processing Unit).

Figure 3:
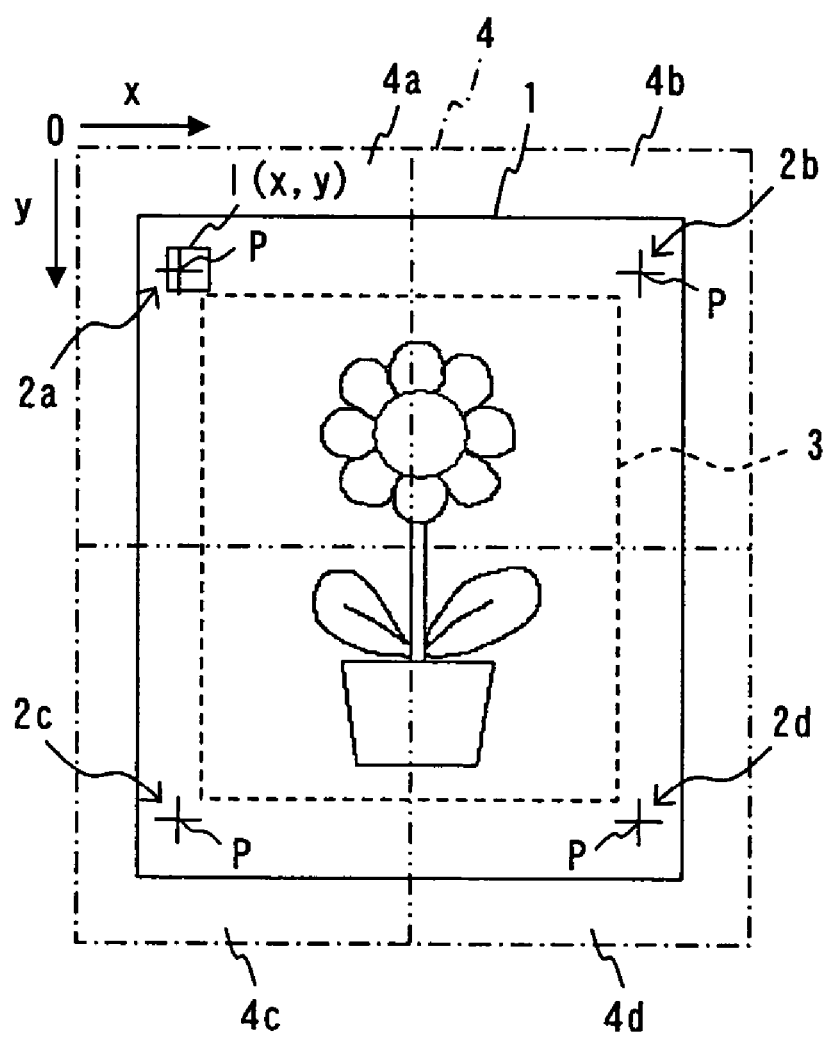
FIG. 3 is an illustrative view showing an original image to be read into a specified image position estimating apparatus according to an embodiment of the present invention.

The image reading unit 10 picks up the image 1 to get the image 1 into the arithmetic unit 20 and, for example, it is constructed with a camera. FIG. 3 shows an original image 4 to be taken by the image reading unit 10 and fetched into the arithmetic unit 20. Incidentally, image data to be fetched into the arithmetic unit 20 in a manner such that the image reading unit 10 picks up the image 1 (medium 10) will be referred to hereinafter as the "original image 4".

As FIG. 3 shows, since the size of the image 1 in the original image 4 to be fetched into the arithmetic unit 20 varies in accordance with the imaging distance from the image reading unit 10 to the image 1, and the size of the image 1 in the original image becomes smaller as the imaging distance increases (becomes longer). On the other hand, the size of the image 1 in the original image 4 to be fetched into the arithmetic unit 20 becomes larger as the imaging distance from the image reading unit 10 to the image 1 decreases (becomes shorter).

In addition, as FIG. 2 shows, the arithmetic unit 20 is composed of an original image storage device 21, a position detection point detecting unit 22 and a specified image position estimating unit 26.

The original image storage device 21 is for fetching, as the image data, the original image 4, acquired by picking up the image 1 through the use of the image reading unit 10, into the arithmetic unit 20 and for storing it.

The position detection point detecting unit 22 is for detecting the position detection point P of the position detection mark 2 on the original image 4 stored in the original image storage device 21, and it includes an original image dividing unit 23, a cross correlation calculating unit 24 and a position detection point specifying unit 25.

The original image dividing unit 23 is made to divide the original image 4 in accordance with the number or position detection marks 2 affixed to the previously known image 1 and the rough locations thereof. In this embodiment, since the position detection marks 2a to 2d are affixed to the four corner portions of the image 1, let it be assumed that the original image 4 is divided into two sections in the width (x) direction and further divided into two sections in the height (y) direction so that the original image 4 is equally divided into four divided areas 4a to 4d each including the corresponding one of the position detection marks 2a to 2d. That is, the original image dividing unit 23 divides the original image 4 into the four areas 4a to 4d partitioned by the two-dot chain lines shown in FIG. 3.

Figure 4:
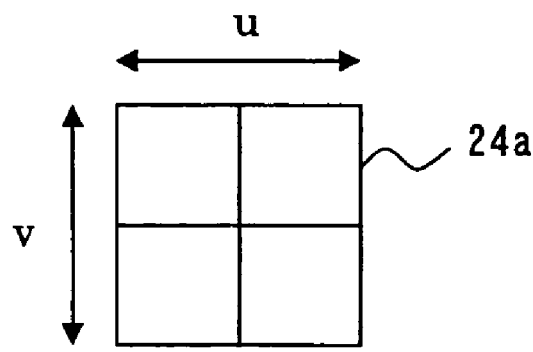
FIG. 4 is an illustrative view showing a template to be used in a cross correlation calculating unit of a specified image position estimating apparatus according to an embodiment of the present invention.

The cross correlation calculating unit 24 scans the original image 4 with respect to each of the divided areas 4a to 4d, obtained in a manner that the original image dividing unit 23 divides the original image 4, through the use of a template 24a (see FIG. 4) serving as a region of interest and having the same configuration as that of a portion including the position detection point P in the position detection mark 2, thereby calculating a cross correlation between the template 24a and a unit scan area on the original image 4. That is, the cross correlation calculating unit 24 conducts the matching by calculating the cross correlation between the template 24a and the unit scan area on the original image 4 and obtains a coefficient of correlation with respect to the template 24a at every unit scan area through the calculation of the cross correlation. FIG. 4 shows the template 24a to be used in the cross correlation calculating unit 24. As shown in FIG. 4, the template 24a to be used in the cross correlation calculating unit 24 is made to have the same shape as that of the vicinity of the position detection point P, with the same crucial pattern intersection as the position detection point P being located at a central portion of the template 24a. The cross correlation calculating method in the cross correlation calculating unit 24 will be described later with reference to FIG. 7.

The position detection point specifying unit 25 specifies the position of the position detection point P on the original image 4 with respect to each of the divided four areas, obtained by the original image dividing unit 23, on the basis of the calculation result in the cross correlation calculating unit 24, i.e., the correlation coefficient for each unit scan area, in the condition that the position detection point P exists in the unit scan area showing the largest correlation coefficient value.

The specified image position estimating unit 26 is made to estimate the position of the specified image 3 in the original image 4 on the basis of the position detection mark 2 in each of the four areas specified by the position detection point specifying unit 25 of the position detection point detecting unit 22. That is, the specified image position estimating unit 26 specifies the position of the specified image 3 on the original image 4 on the basis of the position of each of the previously set position detection marks 2a to 2d relative to the specified image 3.

Figure 5A:
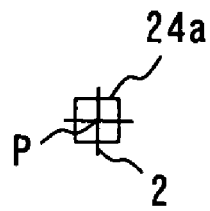
FIGS. 5A, 5B and 5C are illustrations of the relationship between a position detection mark whose size varies and a template.
Figure 5B:
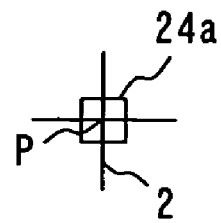
Figure 5C:
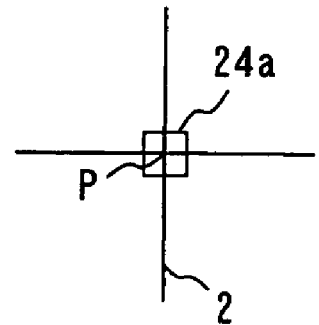

As described above, with the specified image position estimating apparatus 101 according to this embodiment, the image 1 in the original image 4 fetched by the image reading unit 10 varies in size in accordance with the imaging distance from the image reading unit 10 to the image 1 and the size of the position detection mark 2 thereof also varies. FIGS. 5A to 5C are illustrations of the relationship between the position detection marks 2 varying in size and the template 24a. Although the size of the position detection mark 2 diversely varies, for example, as shown in FIGS. 5A to 5C, the position detection mark 2 has a portion (that is, portion around the position detection point P) which does not vary even if the size of the portion detection mark 2 varies, and the cross correlation calculating unit 24 sets this portion as the region of interest (template 24a), so the position detection point specifying unit 25 can specify the position of the position detection point P on the original image 4 through the use of only the single template 24a irrespective of the size of the position detection mark 2.

Figure 18:
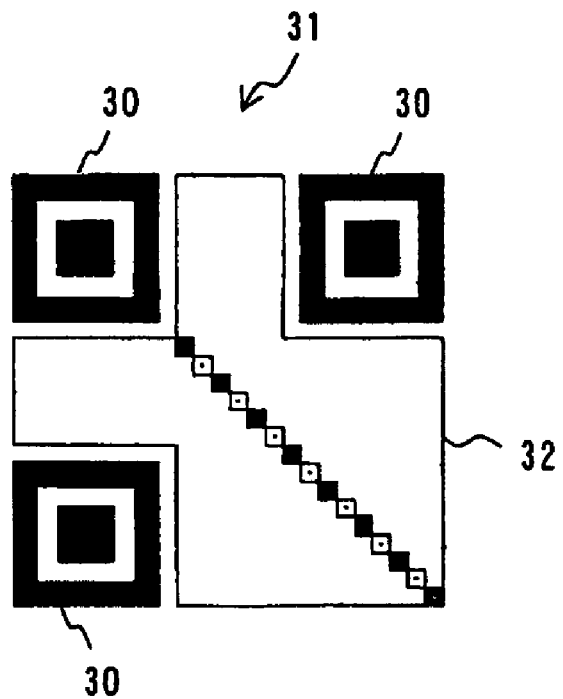
FIG. 18 is an illustrative view showing an image to be used for image position estimation using a conventional mark.
Figure 19:
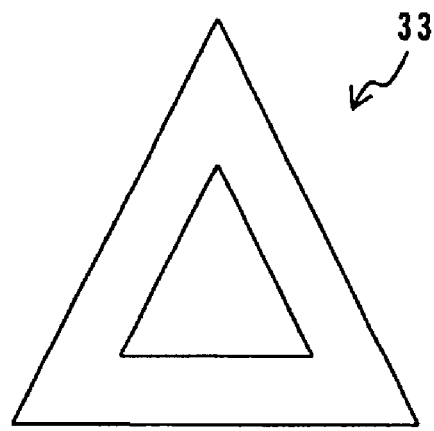
FIG. 19 is an illustrative view showing a conventional mark to be affixed to an image.

That is, even if the size of the position detection mark 2 varies, as shown in FIGS. 5A to 5C, since the correlation coefficient calculated when the center of the template 24a and the position detection point P overlap (coincide) with each other shows a maximum value, the position detection point detecting unit 22 can securely detect the position detection point P of the position detection mark 2 irrespective of the size of the position detection mark 2. Incidentally, although the conventional marks 30 and 33 shown in FIGS. 18 and 19 have portions whose shape does not vary even if the sizes of the marks 30 and 33 vary, a plurality of portions in each of the marks 30 and 33 are in this situation, and even if the cross correlation is calculated by scanning a template focusing on one of these portions, the calculation result shows a plurality of values identical or almost identical to each other. This makes it difficult to accurately detect the focusing portion.

Figure 6:
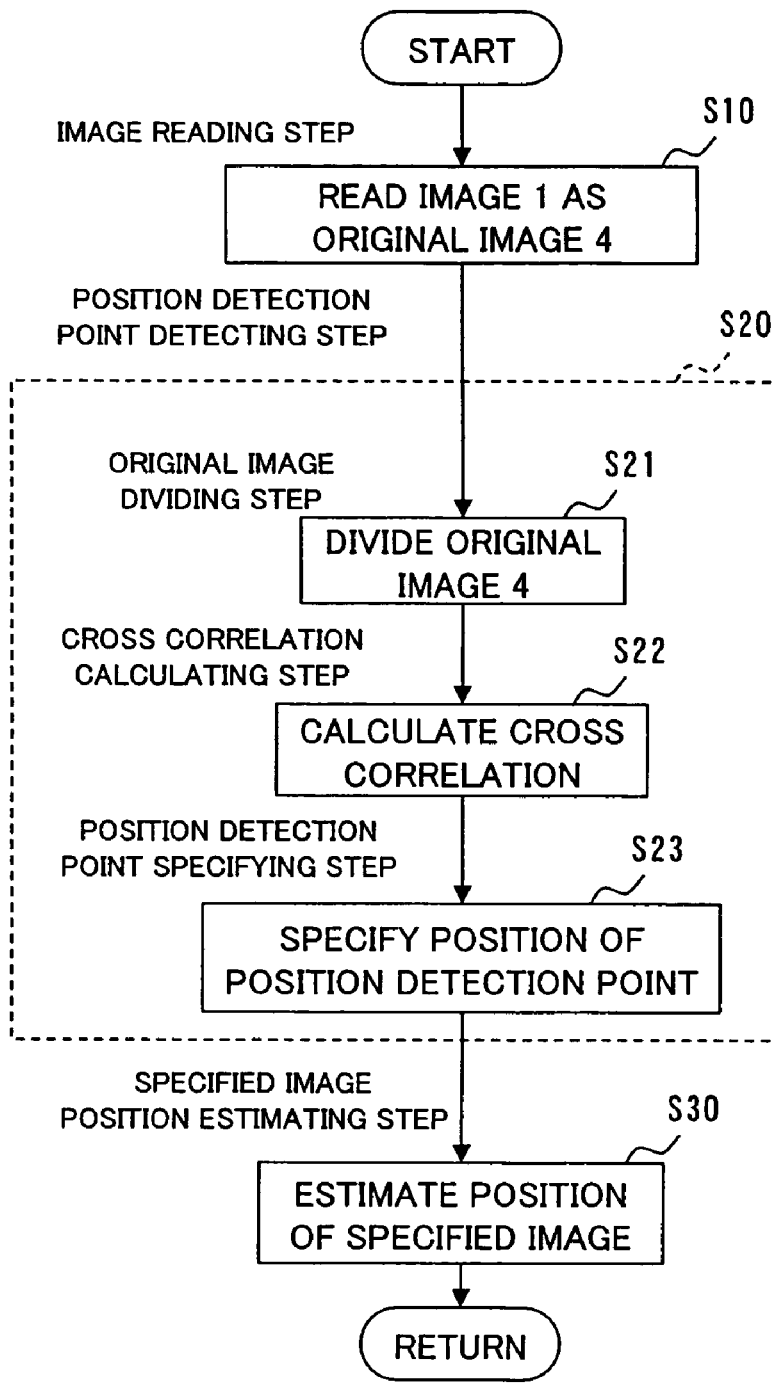
FIG. 6 is a flow chart useful for explaining a procedure of a specified image position estimating method according to an embodiment of the present invention.

Furthermore, a description will be given hereinbelow of a specified image position estimating method (operation of the specified image position estimating apparatus 101) according to this embodiment. FIG. 6 is a flow chart (steps S10, S20 to 23, and S30) useful for explaining a procedure of the specified image position estimating method according to this embodiment. As shown in FIG. 6, in the specified image position estimating method according to this embodiment, first, in an image reading step S10, the image reading unit 10 takes in the image 1 as the original image 4 and the original image storage device 21 stores the original image 4.

Subsequently, in an original image dividing step S21, the original image dividing unit 23 divides the original image 4 in accordance with the number of position detection marks 2 and the locations thereof (in this case, dividing into four areas as shown in FIG. 3).

Moreover, in a cross correlation calculating step S22, the cross correlation calculating unit 24 scans the original image 4 through the use of the template 24a, having the same shape as that of a portion including the position detection point P in the position detection mark 2, with respect to each of the divided areas obtained in the original image dividing step S21, and calculates the cross correlation between the template 24a and the unit scan area on the original image 4.

Figure 7:
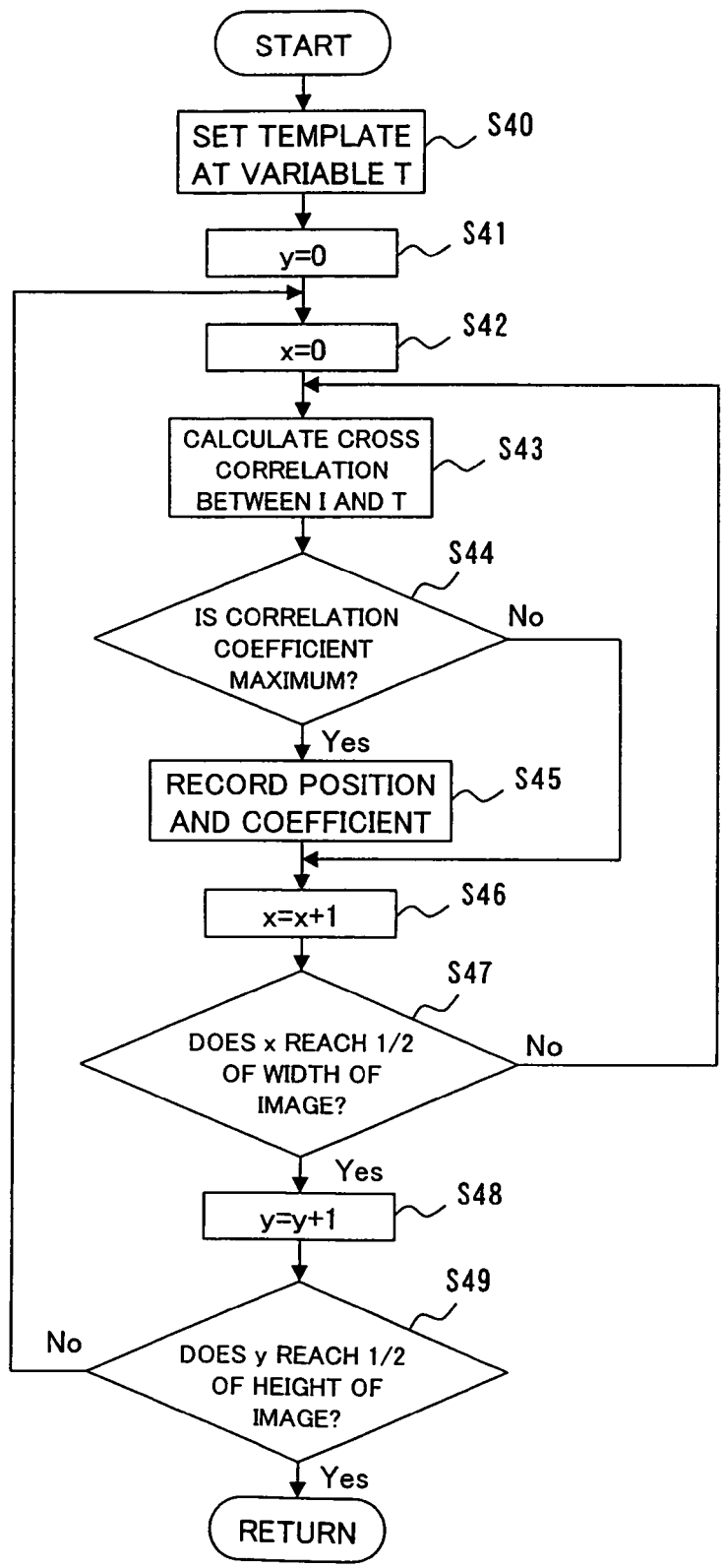
FIG. 7 is a flow chart useful for explaining a procedure of a cross correlation calculating step in a specified image position estimating method according to an embodiment of the present invention.

A detailed description will be given hereinbelow of the processing in the cross correlation calculating step S22. FIG. 7 is a flow chart useful for explaining a procedure of the cross correlation calculating step S22. As shown in FIG. 7, in the cross correlation calculating step S22, the cross correlation calculating unit 24 first prepares the aforesaid template 24a and sets this template 24a at a variable T [t (u, v); see FIG. 4 with respect to u, v] (step S40). In this case, the size of the template 24a is set to be smaller than that of the position detection mark 2 in the original image 1.

In addition, a scan starting position of a unit scan area I is set in accordance with an area on which the cross correlation is calculated this time. For example, a description will be given of an example in which the area 4a is an object of calculation. To set a position I (x, y) of the unit scan area I at the origin, y is set at 0 (step S41) and x is set at 0 (step S42).

Incidentally, the unit scan area I has the same size as that of the template 24a, and it can be expressed by a variable f (u+x, v+y).

Following this, the cross correlation calculating unit 24 calculates the cross correlation between the unit scan area I at the origin and the template 24a according to the following equation (1) (step S43). In the following equation (1), s represents a domain of the template 24a.

$$\iint_s t(x,y) f(u+x, v+y) du dv \qquad (1)$$

Moreover, the cross correlation calculating unit 24 makes a decision as to whether or not the correlation coefficient obtained as the calculation result of the aforesaid equation (1) takes the maximum value of the past calculations (step S44)

If the correlation coefficient calculated this time indicates the maximum value (Yes route of step S44), the cross correlation calculating unit 24 puts the correlation coefficient, calculated this time, together with the position I (x, y) of the unit scan area I in a storage device such as a RAM (Random Access Memory) for a temporary storage (step S45).

On the other hand, if the correlation coefficient calculated this time is not at the maximum (No route of step S44), the operational flow advances to the next step (step S46) after skipping over the aforesaid step S45.

Still moreover, the cross correlation calculating unit 24 advances the position I (x, y) of the unit scan area I by one pixel in the x direction (scanning direction) (step S46) and makes a decision as to whether or not the position I (x, y) of the unit scan area I reaches ½ in the width direction on the original image 4 (x direction) (step S47). If a decision is made that the position I (x, y) of the unit scan area I does not reach ½ in the width direction on the original image 4 (No route of step S47), the cross correlation calculating unit 24 returns to the processing in the aforesaid step S43 and repeatedly implements the processing in the aforesaid steps S43 to S46 until a decision is made that the position I (x, y) of the unit scan area I has reached ½ in the width direction on the original image 4 (Yes route of step S47).

Furthermore, when the position I (x, y) of the unit scan area I has reached ½ of the original image 4 in the width direction (Yes route of step S47), the cross correlation calculating unit 24 advances of the position I (x, y) of the unit scan area I by one pixel in the y direction (secondary scanning direction) (step S48) and makes a decision as to whether or not the position I (x, y) of the unit scan area I reaches ½ in the height direction (y direction) on the original image 4 (step S49).

If a decision is made that the position I (x, y) of the unit scan area I does not reach ½ in the height direction on the original image 4 (No route of step S49), the cross correlation calculating unit 24 returns to the processing in the aforesaid step S42 and repeatedly implements the processing in the aforesaid steps S42 to S48 until a decision is made that the position I (x, y) of the unit scan area I has reached ½ in the height direction on the original image 4 (Yes route of step S49).

On the other hand, if the position I (x, y) of the unit scan area I has reached ½ in the height direction on the original image 4 (Yes route of step S49), the cross correlation calculating unit 24 terminates the processing.

Thus, in the cross correlation calculating step S22, the cross correlation calculating unit 24 calculates the cross correlation between the template 24a in the area 4a of the original image 4 and the unit scan area I. Also with respect to the areas 4b to 4d of the original image 4, other than the setting of the scan starting position (that is, the processing in steps S41 and S42) and the end position, the cross correlation between the template 24a and the unit scan area I is calculated in like procedure. After the processing is conducted with respect to all the areas 4a to 4d, the processing in the cross correlation calculating step S22 comes to an end.

In addition, as shown in FIG. 6, in the position detection point specifying step S23, the position detection point specifying unit 25 specifies the position of the position detection point P with respect to each of the divided areas 4a to 4d, obtained in the original image dividing step S21, on the basis of the calculation result in the cross correlation calculating step S22, i.e., the correlation coefficient relative to the template 24a for each unit scan area, in the condition that the position detection point P exists in the unit scan area (in this case, the center of the unit scan area I) showing the largest correlation coefficient value. That is, as the position detection point P exists at the position I (x, y) of the unit scan area I where the correlation coefficient stored in the aforesaid step S45 of FIG. 7 shows a maximum, the position of the position detection point P is specified with respect to each of the areas 4a to 4d.

In this case, the original image dividing step S21, the cross correlation calculating step S22 and the position detection point specifying step S23 function as the position detection point detecting step S20 to detect the position detection point P in the position detection mark 2 on the original image 4.

Moreover, in the specified image position estimating step S30, the specified image position estimating unit 26 estimates the position of the specified image 3 in the original image 4 on the basis of the position of the position detection point P in each area (in this case, four areas), detected in the position detection point detecting step S20, on the original image 4, and the processing comes to an end.

As described above, in the specified image position estimating apparatus 101 and the specified image position estimating method according to one embodiment of the present invention, since the position detection point detecting unit 22 detects the position detection mark 2 in the image 1 through the use of, as the template 24a, the same configuration as that of the vicinity of the position detection point P, even if the size of the position detection mark 2 to be fetched in accordance with the imaging distance between the image reading unit 10 and the image 1 varies, the position of the position detection point P on the original image 4 can fast and accurately be specified only by scanning the original image 4 through the use of the single template 24a so that the specified image position estimating unit 26 securely estimates the position of the specified image 3 in the image 1 on the basis of the position detection point P.

In addition, since the original image dividing unit 23 divides the original image 4 in accordance with the position detection marks 2, the detection of one position detection point P from one area becomes realizable, and the detection of the position detection point P can be made with higher accuracy and higher efficiency in comparison with a case of detecting a plurality of position detection points P from one area.

[2] Example of Application of the Present Invention

Secondly, a description will be given hereinbelow of examples of application of the specified image position estimating apparatus, the specified image position estimating method and the medium according to the embodiment of the present invention.

[2-1] First Application Example

Figure 8A:
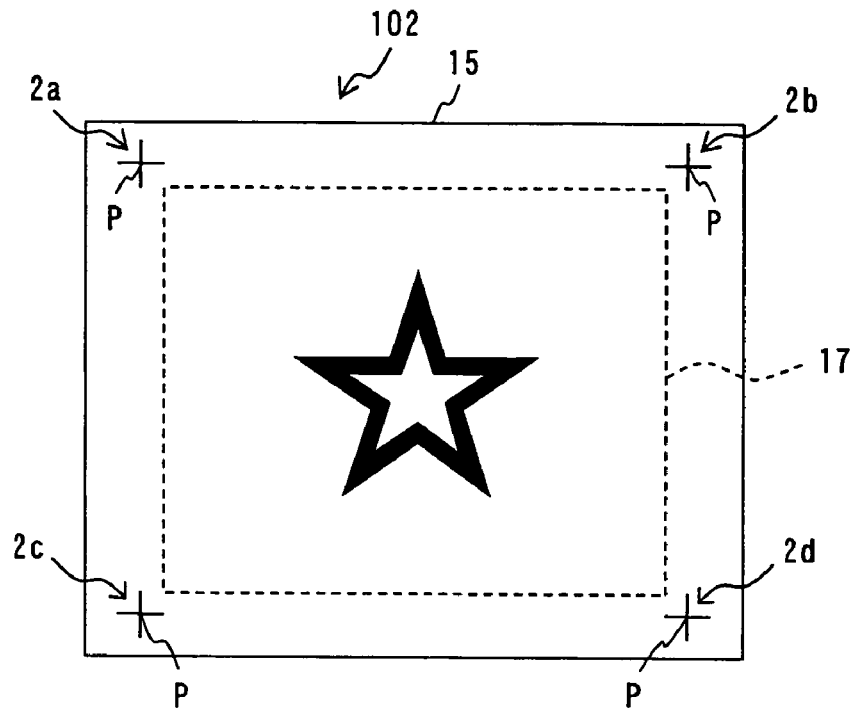
FIGS. 8A and 8B are illustrative views showing cards in a game system employing a medium according to an embodiment of the present invention.
Figure 8B:
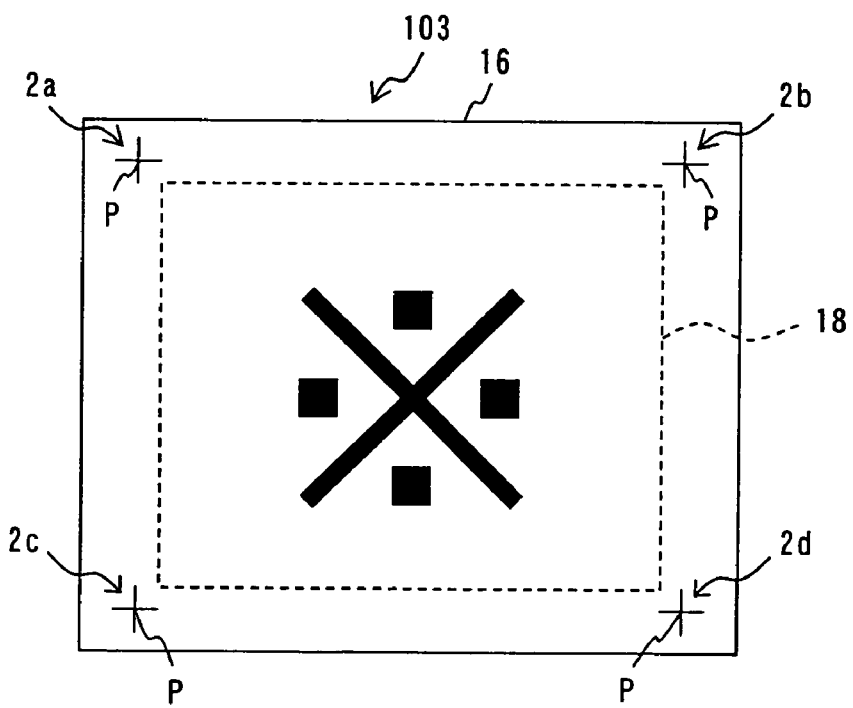

As the first application example, the specified image position estimating apparatus, the specified image position estimating method and the medium according to the embodiment of the present invention are applicable to, for example, a game system 104 (see FIG. 9) using cards (mediums) 102 and 103 shown in FIGS. 8A and 8B. As other information different from image data, peculiar information to be used for games (play) are embedded in a specified image 17 of an image 15 of the card 102 and in a specified image 18 of an image 16 of the card 103, respectively. In FIGS. 8A and 8B, the same reference numerals as those in FIG. 1 designates similar or almost similar parts.

Figure 9:
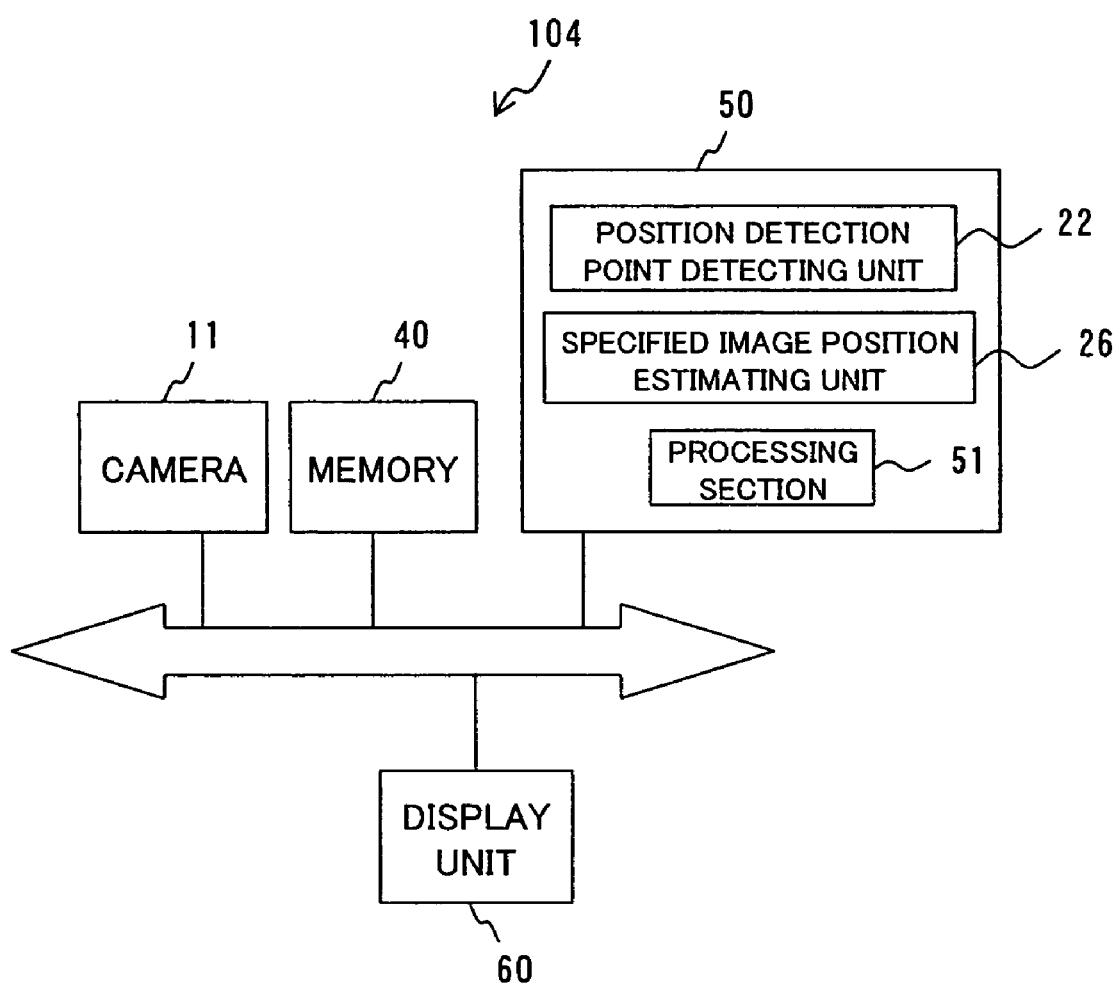
FIG. 9 is a block diagram showing a game system employing as specified image position estimating apparatus according to an embodiment of the present invention.

FIG. 9 is a block diagram showing a configuration of the game system 104 employing the specified image position estimating apparatus, the specified image position estimating method and the medium according to the embodiment. As shown in FIG. 9, the game system 104 is composed of a camera 11, a memory 40, an arithmetic unit (CPU or the like) 50 and a display unit 60. The camera 11 fulfills a function as the aforesaid image reading unit 10 to take in images of the cards 102 and 103 as original images, and the memory 40 stores information needed for the game and carries out a function as the original image storage device 21. Moreover, the arithmetic unit 50 is made up of a processing unit 51 for fulfilling a function as a decoder (game information acquiring unit) to decode information to be used for the game and different from the image data and embedded in the specified images 17 and 18 for conducting the processing on the basis of the decoded information, a position detection point detecting unit 22 and a specified image position estimating unit 26. Thus, the processing unit 51 can carry out the game on the basis of the information read out from the specified images 17 and 18 of the cards 102 and 103.

For example, in a case in which the game system 104 shown in FIG. 9 is designed to make a competitive game between the cards 102 and 103 on the basis of game information embedded in the specified images 17 and 18 of the images 15 and 16, the game is made according to the following procedure.

Figure 10:
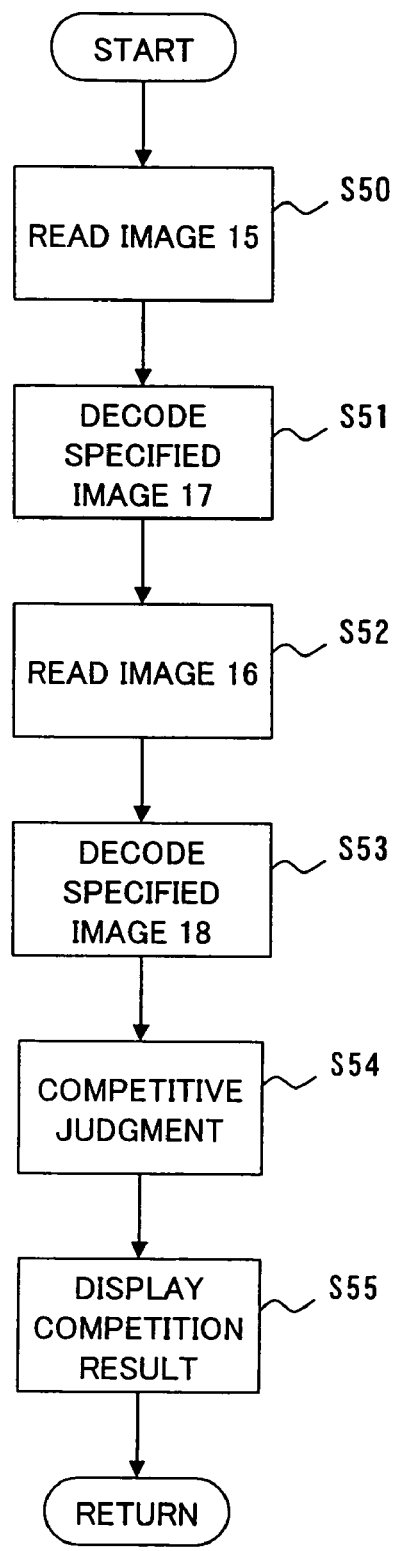
FIG. 10 is a flow chart useful for explaining a procedure of a game in the game system shown in FIG. 9.

FIG. 10 is a flow chart (steps S50 to S55) useful for explaining the procedure of a game in the game system 104. As shown in FIG. 10, first, as in the case of the processing in the aforesaid image reading step S10, the camera 11 serving as the image reading unit 10 takes in the image 15 (card 102) of the card 102 (step S50). Moreover, as well as the processing in the aforesaid position detection point detecting step S20 and specified image position estimating step S30, the position detection point detecting unit 22 and the specified image position estimating unit 26 in the arithmetic unit 50 estimates the position of the specified image 17 on the image 15, and the processing unit 51 decodes the information embedded in the specified image 17 on the basis of the position of the specified image 17 (step S51).

Subsequently, as well as the aforesaid processing (steps S50 and S51) on the image 15, the image 16 (card 103) of the card 103 is fetched (step S52) and the information embedded in the specified image 18 is decoded (step S53).

Following this, the processing unit 51 makes a competitive judgment (in this case, judgment on winning or losing) on the cards 102 and 103 on the basis of the decoded information from the specified image 17 of the image 15 and the decoded information from the specified image 18 of the image 16 (step S54).

In addition, the processing unit 51 displays the competition result between the cards 102 and 103 on a display unit 60 (step S55), and this game comes to an end.

Thus, the specified image position estimating apparatus, the specified image position estimating method and the medium according to the embodiment of the present invention are applicable to the game system 104 shown in FIG. 9, and this game system 104 can provide the effects similar to those of the above-described embodiment.

[2-2] Second Application Example

Figure 11:
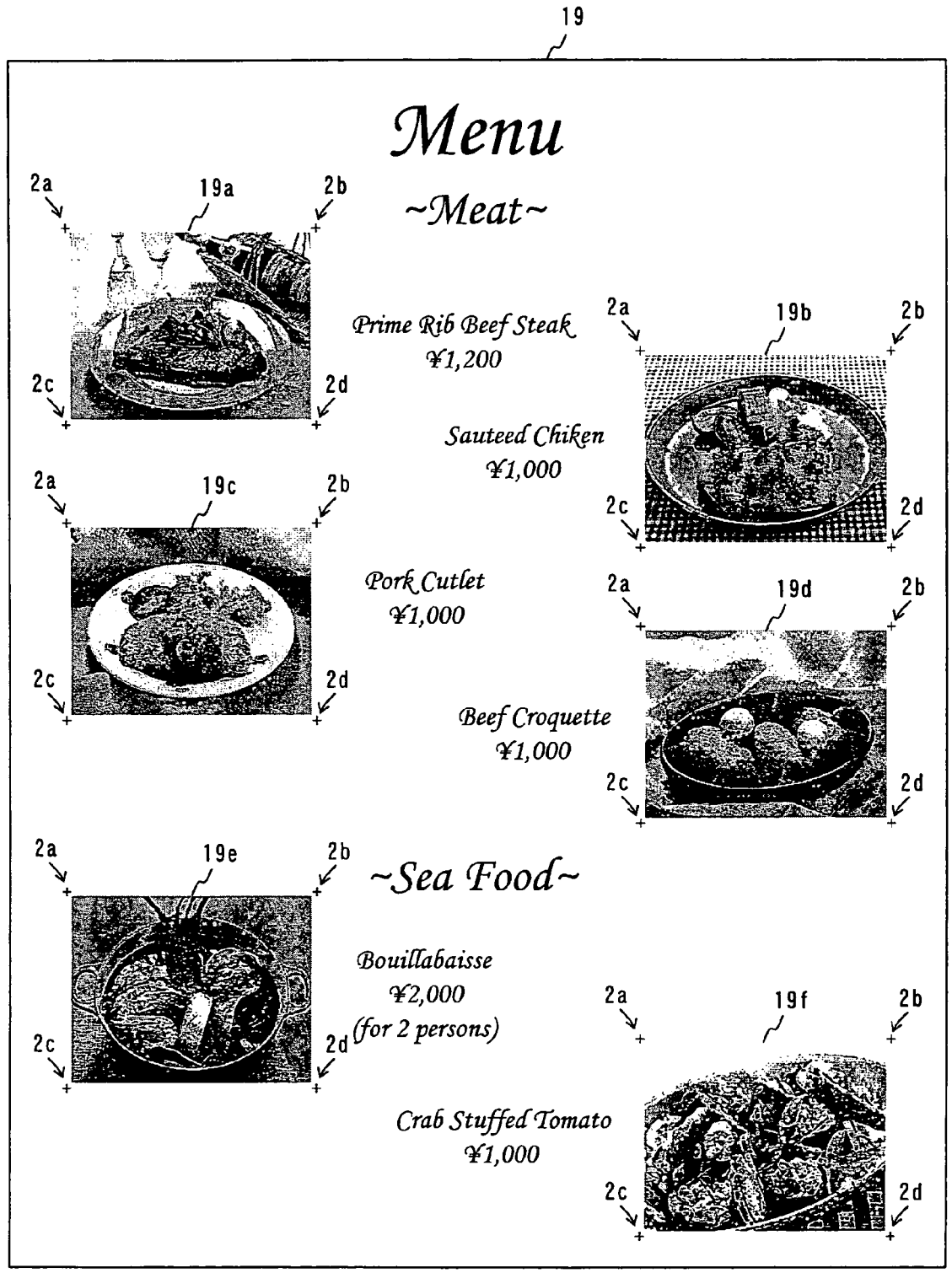
FIG. 11 is an illustrative view showing a menu table in an order system employing a medium according to an embodiment of the present invention.

As the second application example, the specified image position estimating apparatus, the specified image position estimating method and the medium according to the embodiment of the present invention are applicable to various types of transaction systems (transaction apparatus) for making transactions on things, information and others. For example, they are applicable to an order system (transaction apparatus) 105 (see FIG. 12) using a menu table (medium) 19 shown in FIG. 11. Information needed for the order (transaction) and information such as prices are embedded in each of specified images 19a to 19f in the menu table 19. Moreover, in FIG. 11, the same reference numerals as those in FIG. 1 designate similar or almost similar parts.

Figure 12:
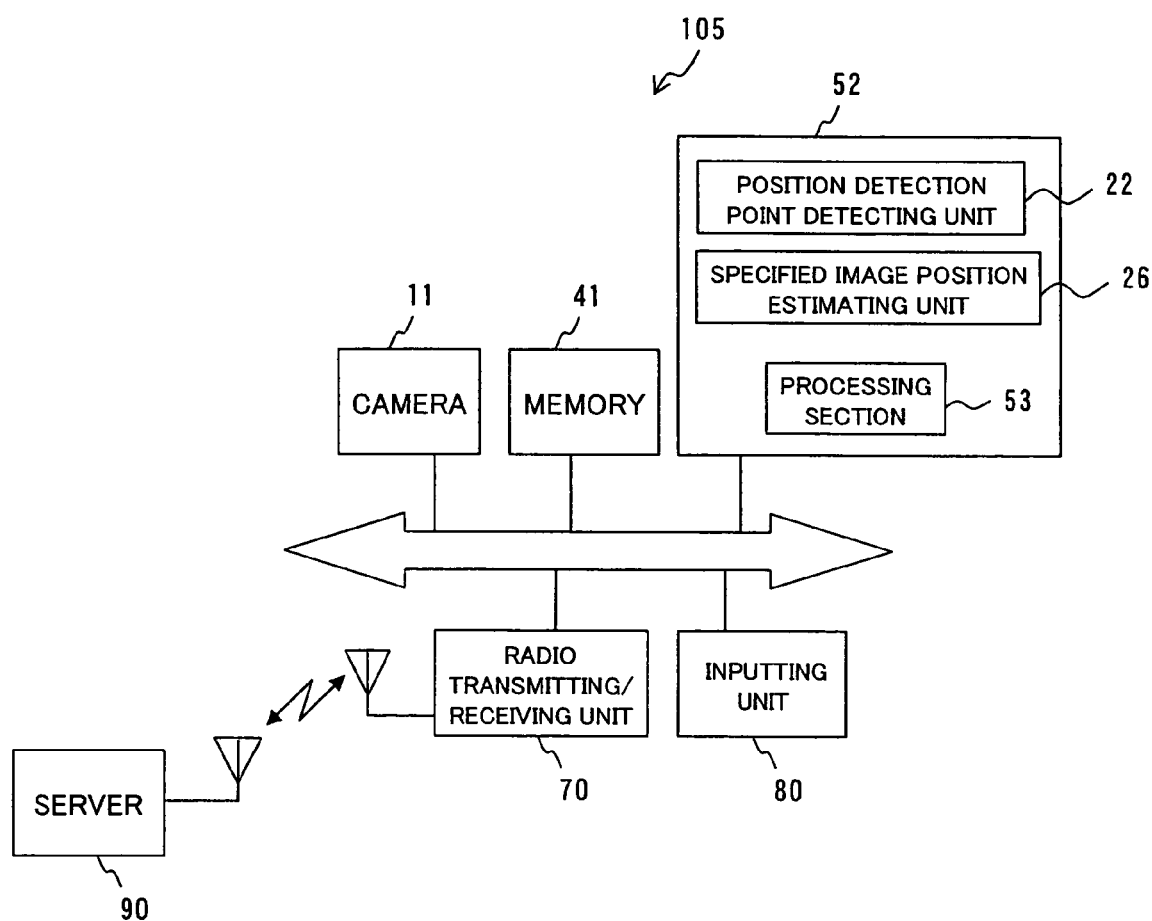
FIG. 12 is a block diagram showing a configuration of an order system employing a specified image position estimating apparatus according to an embodiment of the present invention.

That is, as shown in FIG. 12, the order system 105 is made up of a camera 11, a memory 41, an arithmetic unit (CPU or the like) 52, a radio transmitting/receiving unit 70, an inputting unit 80 and a server 90. In this order system 105, the camera 11 functions as the aforesaid image reading unit 10 to take in an image of the menu table 19 as an original image, and the memory 41 stores information needed for the order and functions as the aforesaid original image storage device 21. Moreover, the arithmetic unit 52 is composed of a processing unit 53 functioning as a decoder (transaction information acquiring unit) to decode information to be used for the order and different from image data embedded in the specified images 19a to 19f of the menu table 19 and made to conduct the processing on transactions on the basis of the decoded information, and the aforesaid position detection point detecting unit 22 and specified image position estimating unit 26. The processing unit 53 can carry out an order to the server 90 on the basis of the information read out from each of the specified images 19a to 19f of the menu table 19 through the use of the radio transmitting/receiving unit 70. The inputting unit 80 is for, for example, canceling the number of orders or processing and, in this case, the camera 11 and the inputting unit 80 constitutes an ordering device whereby a customer gives an order on the basis of the menu table 19.

Figure 13:
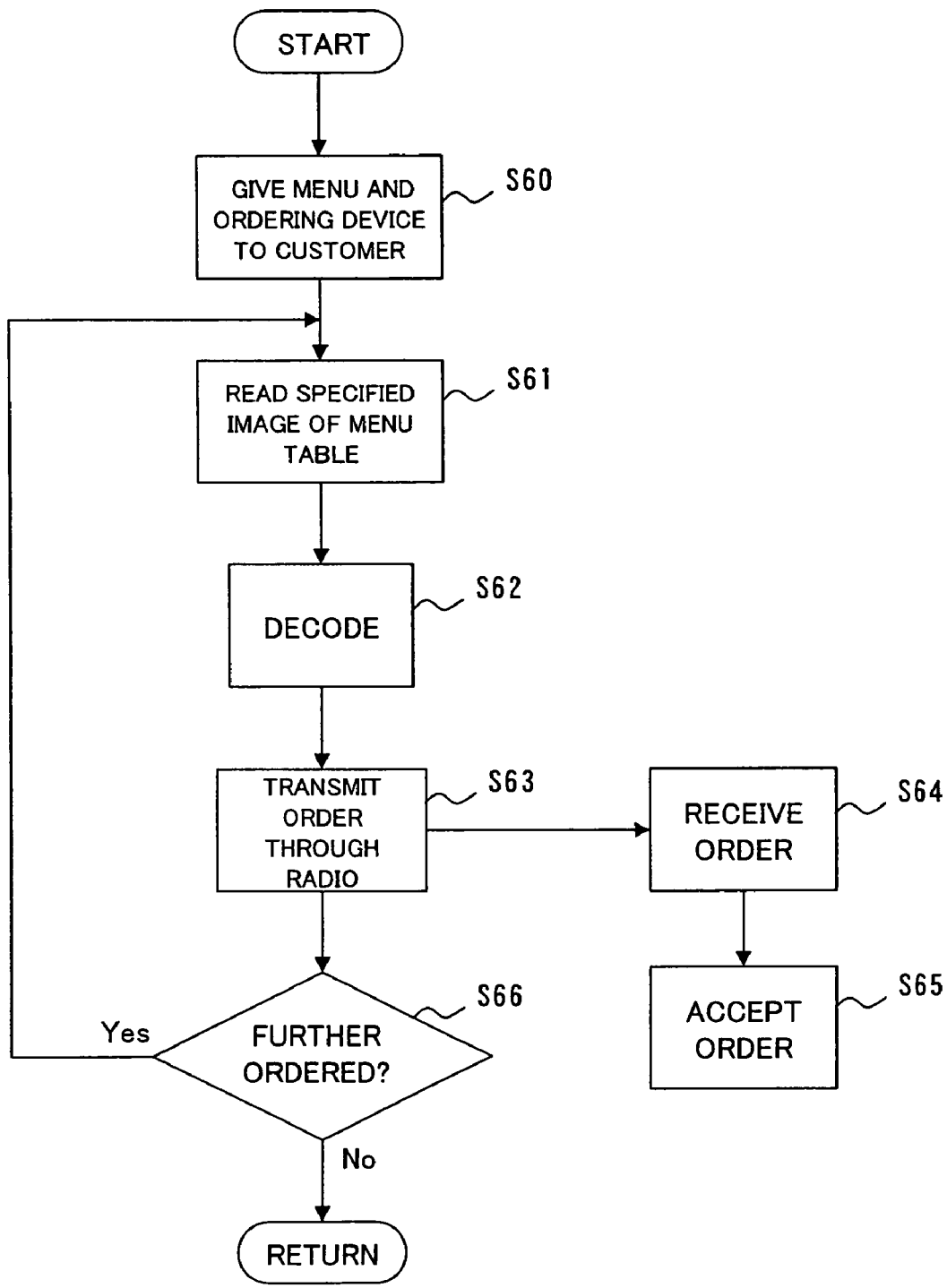
FIG. 13 is a flowchart useful for explaining an operation of the order system shown in FIG. 12.

FIG. 13 is a flow chart (steps S60 to S66) useful for explaining an operation of the order system 105 shown in FIG. 12. As shown in FIG. 13, in the order system 105 shown in FIG. 12, the menu table 19 and the ordering device are delivered to a customer who gives an order (step S60), and the customer picks up a desired menu of the menu table 19, i.e., a desired specified image (in this case, the specified image 19a) of the specified images 19a to 19f to be ordered, through the use of the camera 11 of the ordering device for fetching an image including the specified image 19a as an original image into the memory 41 (step S61).

Following this, as in the case of the aforesaid position detection point detecting step S20 and specified image position estimating step S30, the position detection point detecting unit 22 and the specified image position estimating unit 26 in the arithmetic unit 52 estimates the position of the specified image 19a on the menu table 19, and the processing unit 53 decodes the information embedded in the specified image 19a on the basis of the position of the specified image 19a (step S62).

Moreover, the processing unit 53 transmits the decoded information, embedded in the specified image 19a, through the radio transmitting/receiving unit 70 to the server 90 (step S63).

Incidentally, it is also appropriate that, prior to radio-transmitting the decoded information to the server 90, the processing unit 53 checks whether or not the decoded information is correctly decoded.

Subsequently, upon receipt of the information which has been embedded in the specified image 19a and radio-transmitted through the radio transmitting/receiving unit 70 (step S64), the server 90 accepts the order about the specified image 19a on the basis of this information (step S65).

After the processing in the aforesaid step S63, the processing unit 53 makes a decision as to whether or not there is a further order (step S66), and if the customer places a further order, the operational flow returns to the aforesaid processing in the step S61 (Yes route of step S66). If there is no further order, the processing comes to an end (No route of step S66).

As described above, the specified image position estimating apparatus, the specified image position estimating method and the medium according to the embodiment of the present invention are applicable to the order system 105 shown in FIG. 12, and this order system 105 serving as a transaction apparatus can provide the effects similar to those of the above-described embodiment.

[3] Others

It should be understood that the present invention is not limited to the above-described embodiments, and that it is intended to cover all changes and modifications of the embodiments of the invention herein which do not constitute departures from the spirit and scope of the invention.

For example, although in the above-described embodiment the original image dividing unit 23 in the original image dividing step S21 is made to divide the original image 4 in accordance with the position detection marks 2 in the image 1, it is also acceptable that the position detection point detecting unit 22 is not equipped with the original image dividing unit 23 and the original image dividing step S21 is omitted from the specified image position estimating method according to the present invention. In this case, for example, in the cross correlation calculating step S22, the cross correlation calculating unit 24 is made to store the unit scan areas corresponding to the first- to fourth-highest correlation coefficients (including the maximum correlation coefficient) of the correlation coefficients between the template 24a and the unit scan areas, and in the position detection point specifying step S23, the position detection point specifying unit 25 specifies the positions of the position detection points P as the position detection point P exists in each of these four unit scan areas.

Figures 14A, 14B, 14C, 14D, 14E:
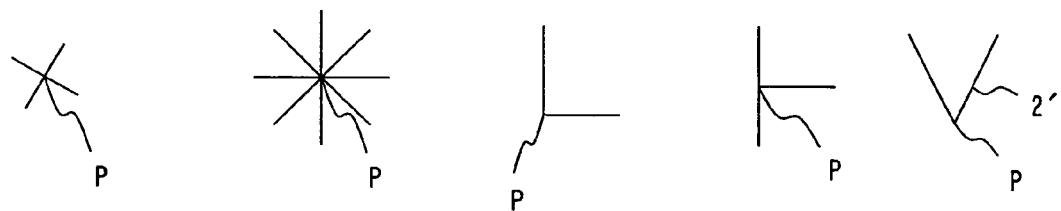
FIGS. 14A to 14E are illustrative views showing modifications of a position detection mark according to the present invention.
Figures 15A, 15B, 15C:
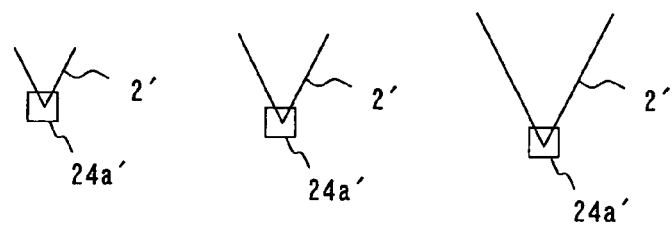
FIGS. 15A to 15C are illustrations of the relationship between a position detection mark whose size varies and a template.

In addition, although in the above-described embodiment the position detection mark 2 to be affixed to the image 1 is formed into the configuration shown in FIG. 1, as mentioned above, if satisfying that the position detection mark is made such that at least two straight lines (line segment) intersect with each other or come into contact with each other at one position detection point, it is acceptable. For example, the configurations shown in FIGS. 14A to 14E are also acceptable. That is, the needed point is that the position detection mark has a characteristic that the peripheral configuration around one position detection point P does not vary even if its size varies. FIGS. 15A to 15C are illustrations of the relationship between a position detection mark 2' and a template 24a in conjunction with a variation of the size of the position detection mark 2'. For example, in a case in which the mark shown in FIG. 14E is set as the position detection mark 2', even if the size of the position detection mark 2' diversely varies as shown in FIGS. 15A to 15C, when the cross correlation calculating unit 24 employs a portion around the position detection point P as a template 24a', the position detection point specifying unit 25 can specify the position of the position detection mark 2' on the original image 4 through the use of only the single template 24a' irrespective of the size of the position detection mark 2'.

Still additionally, although in the above-described embodiment four position detection marks 2 are affixed into the image 1, the present invention is not limited to this. That is, since the designation of a specified area is feasible if three position detection marks 2 are affixed into the image 1, the position detection marks 2 to be affixed as position detection object marks to a medium in the present invention can be three or more in number.

Figure 16:
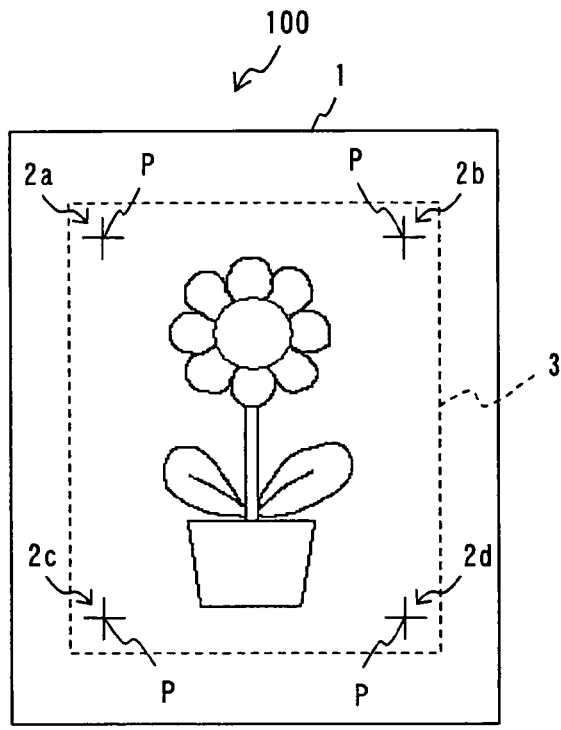
FIG. 16 is an illustrative view showing a medium as a modification according to the present invention.

Yet additionally, although in the above-described embodiment the position detection marks 2a to 2d are affixed outside the specified image 3 in the image 1, the present invention is not limited to this. For example, it is also possible that, as shown in FIG. 16, the position detection marks 2a to 2d are placed inside the specified image 3.

Figure 17:
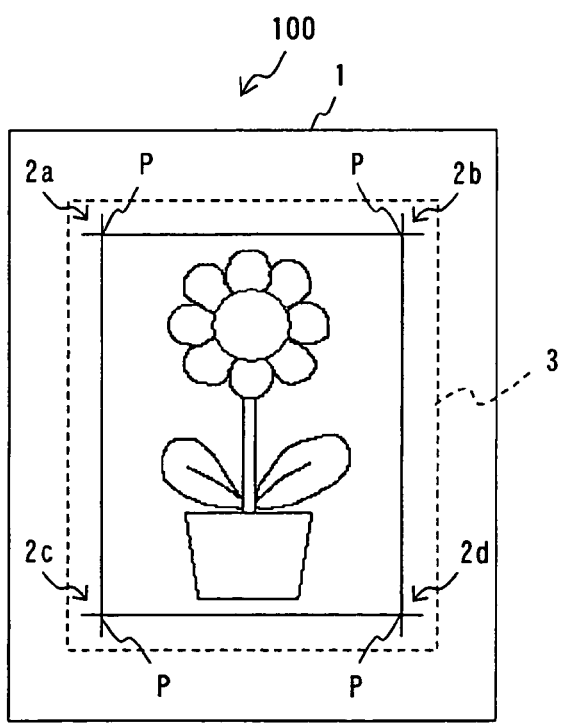
FIG. 17 is an illustrative view showing a medium as a modification according to the present invention.

Moreover, although in the above-described embodiment the position detection marks 2a to 2d are provided in the image 1 as four independent position detection marks, the present invention is not limited to this. For example, it is also appropriate that, as shown in FIG. 17, four position detection marks 2a to 2d are formed in a state connected through straight lines to each other. In this case, in the cross correlation calculating step S22, when the cross correlation calculating unit 24 detects any one of the straight lines, the direction of scanning the template 24a is determined on the basis of this straight line, which enables the position detection point P to be detected more efficiently. That is, when the template 24a is scanned along the straight line constituting the position detection mark 2, the position detection point P is detectable at a higher speed.

In the specified image position estimating apparatus according to the present invention, in a case in which the original image 4 is stored in the original image storage device 21 through the use of some unit other than the image reading unit 10, there is no need to prepare the image reading unit 10, and it is also possible that the position of the specified image 3 in the image 1 is estimated by the position detection point detecting unit 22 and the specified image position estimating unit 26. Therefore, in this case, the image reading step S10 is omissible from the specified image position estimating method according to the present invention.

Still moreover, although in the above-described embodiment the matching between the template 24a and the unit scan area on the original image 4 is made in a manner such that, in the cross correlation calculating step S22, the cross correlation calculating unit 24 calculates a cross correlation between the template 24a and the unit scan area, the present invention is not limited to this. It is also appropriate that the matching between the template 24a and the unit scan area on the original image 4 is made according to a method other than the cross correlation calculating method.

Furthermore, the functions of the aforesaid original image dividing unit 23, cross correlation calculating unit 24, position detection point specifying unit 25 and specified image position estimating unit 26 are realized by carrying out a predetermined application program (specified image position estimating program) in a computer (including CPU, information processing unit and various terminals).

For example, this program is supplied in a state stored in a computer-readable recording medium such as flexible disk, CD-ROM, CD-R, CD-RW or DVD. In this case, the computer reads out the specified image position estimating program from this recording medium and transfers it to an internal storage unit or an external storage unit for putting therein. Moreover, it is also appropriate that the program is recorded in a storage device (recording medium) such as magnetic disk, optical disk or magneto-optical disk and then supplied from the storage device through a communication line to the computer.

In this case, the computer is an concept including a hardware and an OS (Operating System), and signifies hardware operating under control of the OS. Moreover, in a case in which an OS is unnecessary and a hardware is operated by only an application program, this hardware itself corresponds to the computer. The hardware is equipped with at least a microprocessor such as CPU and a unit for reading a computer program recorded in a recording medium. An application program serving as the aforesaid specified image position estimating program includes program codes for making the computer realize the functions of the original image dividing unit 23, the cross correlation calculating unit 24, the position detection point specifying unit 25 and the specified image position estimating unit 26. A portion of the functions can also be realized using an OS without using an application program.

Still furthermore, as the recording medium according to this embodiment, in addition to the above-mentioned flexible disk, CD-ROM, CD-R, CD-RW, DVD, magnetic disk, optical disk and magneto-optical disk, it is also possible to use various types of computer-readable medium such as IC card, ROM cartridge, magnetic tape, punch card, internal storage unit (memory such as RAM or ROM) of a computer, external storage unit and printed matter on which codes such as bar codes are printed.

What is claimed is:

1. A specified image position estimating apparatus comprising:
   a position detection point detecting unit, in a state where three or more position detection marks, each of which is formed such that two or more straight lines intersect with each other or come into contact with each other at one position detection point, are affixed to an original image, detecting said position detection point of each of said position detection marks on said original image; and
   a specified image position estimating unit estimating a position of a specified image in said original image on the basis of said position detection point detected by said position detection point detecting unit,
   wherein said position detection point detecting unit includes:
      a cross correlation calculating unit scanning said original image through the use of a template having the same shape as that of a portion including said position detection point of said position detection mark to calculate a cross correlation between said template and a unit scan area on said original image, and
      a position detection point specifying unit specifying a position of said position detection point on said original image on the basis of said cross correlation calculated by said cross correlation calculating unit.

2. The specified image position estimating apparatus according to claim 1, further comprising:
   an image reading unit reading said original image so that said position detection point detecting unit detects said position detection point of said position detection mark on said original image read by said image reading unit.

3. The specified image position estimating apparatus according to claim 1, wherein said position detection point detecting unit includes an original image dividing unit dividing said original image in accordance with said position detection mark on said original image so that said cross correlation calculating unit calculates said cross correlation for each of divided areas of said original image obtained by said original image dividing unit.

4. The specified image position estimating apparatus according to claim 1, wherein other information different from image data is embedded in said specified image in said original image.

5. The specified image position estimating apparatus according to claim 1, wherein said position detection mark is formed in a color invisible to human beings with respect to a color on said position detection mark affixed said original image and detectable by said position detection point detecting unit.

6. A specified image position estimating method comprising:
   a position detection point detecting step of, in a state where three or more position detection marks, each of which is formed such that two or more straight lines intersect with each other or come into contact with each other at one position detection point, are affixed to an original image, detecting said position detection point of each of said position detection marks on said original image; and
   a specified image position estimating step of estimating a position of a specified image in said original image on the basis of said position detection point detected in said position detection point detecting step,
   wherein said position detection point detecting step includes:
      a cross correlation calculating step of scanning said original image through the use of a template having the same shape as that of a portion including said position detection point in said position detection mark to calculate a cross correlation between said template and a unit scan area on said original image, and a position detection point specifying step of specifying a position of said position detection point on said original image on the basis of said cross correlation calculated in said cross correlation calculating step.

7. The specified image position estimating method according to claim 6, wherein said position detection point detecting step includes an original image dividing step of dividing said original image in accordance with said position detection mark on said original image so that, in said cross correlation calculating step, said cross correlation is calculated with respect to each of divided areas of said original image obtained in said original image dividing step.

8. A game system made to carry out a game through the use of an image printed matter, comprising:

an image reading unit reading, as an original image, an image of said image printed matter to which three or more position detection marks, each of which is formed such that two or more straight lines intersect with each other or come into contact with each other at one position detection point, are affixed along with a specified image which is an object of position estimation;

a position detection point detecting unit detecting said position detection point of said position detection mark on said original image read by said image reading unit;

a specified image position estimating unit estimating a position of said specified image in said original image on the basis of said position detection point detected by said position detection point detecting unit;

a game information acquiring unit acquiring information to be used for said game, different from image data and embedded in said specified image, from said specified image position-estimated by said specified image position estimating unit; and a processing unit conducting processing on said game on the basis of said information acquired by said game information acquiring unit, wherein said position detection point detecting unit includes:

a cross correlation calculating unit scanning said original image through the use of a template having the same shape as that of a portion including said position detection point of said position detection mark to calculate a cross correlation between said template and a unit scan area on said original image, and a position detection point specifying unit specifying a position of said position detection point on said original image on the basis of said cross correlation calculated by said cross correlation calculating unit.

9. A transaction apparatus for making a transaction through the use of an image printed matter, comprising:

an image reading unit reading, as an original image, an image of said image printed matter to which three or more position detection marks, each of which is formed such that two or more straight lines intersect with each other or come into contact with each other at one position detection point, are affixed along with a specified image which is an object of position estimation;

a position detection point detecting unit detecting said position detection point of said position detection mark on said original image read by said image reading unit;

a specified image position estimating unit estimating a position of said specified image in said original image on the basis of said position detection point detected by said position detection point detecting unit;

a transaction information acquiring unit acquiring information to be used for said transaction, different from image data and embedded in said specified image, from said specified image position-estimated by said specified image position estimating unit; and a processing unit conducting processing on said transaction on the basis of said information acquired by said transaction information acquiring unit, wherein said position detection point detecting unit includes:

a cross correlation calculating unit scanning said original image through the use of a template having the same shape as that of a portion including said position detection point of said position detection mark to calculate a cross correlation between said template and a unit scan area on said original image, and a position detection point specifying unit specifying a position of said position detection point on said original image on the basis of said cross correlation calculated by said cross correlation calculating unit.

10. A computer-readable recording medium which records a specified image position estimating program for making a computer function as:

a position detection point detecting unit, in a state where three or more position detection marks, each of which is made such that two or more straight lines intersect with each other or come into contact with each other at one position detection point, are affixed to an original image, detecting said position detection point of each of said position detection marks on said original image; and a specified image position estimating unit estimating a position of a specified image in said original image on the basis of said position detection point detected by said position detection point detecting unit, wherein said position detection point detecting unit includes:

a cross correlation calculating unit scanning said original image through the use of a template having the same shape as that of a portion including said position detection point of said position detection mark to calculate a cross correlation between said template and a unit scan area on said original image, and a position detection point specifying unit specifying a position of said position detection point on said original image on the basis of said cross correlation calculated by said cross correlation calculating unit.

* * * * *